United States Patent [19]

Sato et al.

[11] 4,138,520

[45] Feb. 6, 1979

[54] TRANSLUCENT POLYPROPYLENE FILM AND PROCESS FOR PRODUCING THE SAME

[75] Inventors: Hiroshi Sato, Hiroshima; Munetsugu Nakatani, Ohtake; Hiroshi Nakatsui, Ohtake; Hideto Kakita, Ohtake; Hiroyuki Shimoyama, Ohtake; Naoki Mochida, Ohtake; Shuichi Sugimori, Ohtake, all of Japan

[73] Assignee: Mitsubishi Rayon Co., Ltd., Tokyo, Japan

[21] Appl. No.: 635,373

[22] Filed: Nov. 25, 1975

[30] Foreign Application Priority Data

Nov. 29, 1974 [JP] Japan ............................... 49-138620
Sep. 12, 1975 [JP] Japan ............................... 50-111178
Sep. 16, 1975 [JP] Japan ............................... 50-111883
Oct. 6, 1975 [JP] Japan ............................... 50-120505

[51] Int. Cl.$^2$ ........................ B32B 3/00; B29C 17/00
[52] U.S. Cl. .................................. 428/141; 264/210 R; 264/284; 264/289; 264/291; 428/152; 428/523
[58] Field of Search ............... 428/141, 152, 218, 219, 428/220, 338, 340, 523; 264/210, 284

[56] References Cited

U.S. PATENT DOCUMENTS

| | | | |
|---|---|---|---|
| 3,022,543 | 2/1962 | Baird et al. ............................ | 428/36 |
| 3,217,073 | 11/1965 | Olson et al. ........................... | 264/178 |
| 3,257,490 | 6/1966 | Hovermale et al. ................... | 264/289 |
| 3,260,776 | 7/1966 | Lindstrom et al. ................... | 428/36 X |
| 3,271,495 | 9/1966 | Gronholz et al. ..................... | 264/210 |
| 3,309,452 | 3/1967 | Yumoto et al. ....................... | 264/284 |
| 3,445,324 | 5/1969 | Curler et al. .......................... | 428/340 X |
| 3,536,644 | 10/1970 | Frizelle et al. ........................ | 260/28.5 |
| 3,679,538 | 7/1972 | Druin et al. ........................... | 428/523 X |
| 3,738,904 | 6/1973 | Ikeda et al. ............................ | 428/141 |
| 3,773,608 | 11/1973 | Yoshimura et al. ................... | 428/141 |
| 3,865,674 | 2/1975 | Duling et al. ......................... | 428/220 X |

*Primary Examiner*—P.E. Willis, Jr.
*Attorney, Agent, or Firm*—Oblon, Fisher, Spivak, McClelland & Maier

[57] ABSTRACT

A translucent polypropylene film containing no $\beta$-type crystallization nucleating agent which has, on at least one side, a surface layer composed of a two- or three-dimensional network structure, in which at least 1,000 network elements constituting the said network structure are present per cm$^2$ of the film surface. The said film is obtained in such a manner that an unstretched polypropylene film having, on at least one side, a surface layer having a K value, which represents the amount of $\beta$-type crystals present at a portion from the surface to a thickness of 10% in the thick-wall direction, of at least 0.1 is biaxially stretched under such conditions that the stretching temperature at the stretch initiation point is in the range of 145° to 176° C. and the stretch ratio in one direction is less than 8 times. The above-mentioned film is excellent in mechanical properties, quite dense in inner structure and high in airtightness, and the surface thereof has a fine uneven structure or fibril-like network structure, and has a favorable haze. Accordingly, the said film is used as a film for packing medicines, hygienic materials and foods, and as an insulating oil-impregnated dielectric film for condensers.

1 Claim, 6 Drawing Figures

TRANSLUCENT POLYPROPYLENE FILM AND PROCESS FOR PRODUCING THE SAME

This invention relates to a surface-roughened, translucent polypropylene film containing no β-type cyrstallization nucleating agent, having an inner structure high in airtightness, and having a surface layer composed of a fine uneven structure or a fibril-like network structure; a process for producing the same; and the use of said film.

Heretofore, synthetic resin films, particularly translucent polypropylene films, have widely been utilized as printing papers, tracing papers, films for packing medicines and foods, etc. As processes for producing such surface-roughened translucent polypropylene films, there have been proposed a process in which a polypropylene resin is mixed with an inorganic filler such as calcium carbonate, silica or sodium silicate, and the resulting mixture is melt-extrusion-molded or subjected to post-stretching treatment; and a process in which a polypropylene resin is mixed with a foaming agent, and the resulting mixture is subjected to melt-extrusion-molding to be foamed, thereby roughening the surface of the resulting film. These processes, however, have many disadvantages that the control for formation of roughened surface is difficult, that depending on the kind of substance added for surface roughening, the resulting film is not suitable, from the hygienic standpoint, for use as a film for packing medicines or foods, and that the film is not sufficient in inner airtightness.

On the other hand, there has been proposed a process for producing a translucent polypropylene film in which a mixture of polypropylene with a specific crystallization nucleating agent, e.g. quinacridonequinone, substituted quinacridonequinone or a metal chelate compound thereof, is melt-molded to prepare an unstretched polypropylene film having a β-type crystal structure, and the thus prepared film is then stretched to form fine voids within the stretched film and to deluster the surface thereof. However, the film obtained by the above-mentioned process contains a crystallization nucleating agent, and hence, has the disadvantage that said nucleating agent dissolves out of the interior of the film, or the film itself is deteriorated in chemical resistance. Further, the film produced by the said prior art process has fine voids in the interior thereof, and hence, is low in airtightness. This also becomes a disadvantage depending on the uses of the film.

A biaxially stretched polypropylene film is excellent in insulating resistance and dielectric characteristics, and hence, has recently come to be used as an insulator or dielectric for electric cables, condensers, transformers and the like various electrical appliances which are required to be compact in size, light in weight and high in durability. However, the said polypropylene film is high in surface smoothness, so that when a condenser element is prepared by convoluting the said film together with an electrode foil and a condenser is manufactured by use of said element, the surfaces of the film or the surface of the film and the surface of the electrode foil completely adhere to each other. Consequently, even when the condenser element is dried in vacuum, air or water entrained in the central portion thereof cannot sufficiently be removed. Further, when the said condenser element after vacuum drying is impregnated with an insulating oil, portions unimpregnated with the insulating oil are locally formed within the condenser. If such a condenser is used under voltage, corona discharge is liable to take place, with the result that premature dielectric breakdown under low voltage is undesirably brought about at the unimpregnated portions.

With an aim to obtain a surface-roughened translucent polypropylene film having no such disadvantages as mentioned above, the present inventors conducted extensive studies to find that an unstretched polypropylene molded article prepared by melt-extrusion-molding under specific conditions a crystalline polypropylene containing no specific β-type crystallization nucleating agent is biaxially stretched under specific conditions, whereby a translucent polypropylene film having, on at least one side, a surface layer composed of a two- or three-dimensional network structure.

In accordance with the present invention, there is provided a translucent polypropylene film containing no β-type crystallization nucleating agent which has, on at least one side, a surface layer composed of a two- or three-dimensional network structure in which at least 1,000 network elements are present per $cm^2$ of the film surface.

In accordance with the present invention, there is further provided a process for producing a translucent polypropylene film containing no β-type crystallization nucleating agent which has the specific surface structure mentioned above, characterized in that an unstretched polypropylene molded article having, on at least one side, a surface layer having a K value, which represents the amount of β-type crystals present at a portion from the surface to a thickness of 10% in the thick-wall direction, of at least 0.1 is biaxially stretched under such conditions that the stretching temperature at the stretch initiation point of the said molded article is in the range of 145° to 176° C. and the stretch ratio in one direction is less than 8 times.

The network structure of the surface layer of the translucent polypropylene film of the present invention can be developed by melting phenomenon according to heat treatment, or by dissolution phenomenon according to solvent treatment, of β-type crystals present on the surface of the unstretched polypropylene molded article, and may take various forms. For example, the network structure is composed of network elements consisting of fibril-like materials, creasy materials, film-like materials, crater-like materials or combination thereof. The said fibril-like and creasy materials constitute the parts between the knots of the network structure. The film-like material refers to chip-like material having various forms such as polygonal or stellar form, and, in general, constitutes the knots of the network structure. The appearance of the surface-roughened film composed of an aggregate of network elements consisting of crater-like materials has a lunar surface-like, hill-like or polka dot-like structure. Further, there are some cases where reticular fibrous tissues have been interspread within network elements consisting of said crater-like materials. The above-mentioned fibril-like materials, creasy materials, film-like materials and crater-like materials may independently form the rough surface of the film, but are not always required to constitute the surface independently, and the network structure may be composed of a mixture of said fibril-like materials, creasy materials and crater-like materials. The said network structure may be in the form of a plane, or several layers of such network structures have been developed two- or three-dimensionally to the interior of the film, but it is necessary that these network structures form the rough surface of the film.

The size of the network elements constituting the network structure of the surface layer of the translucent polypropylene film of the present invention may be distributed widely, but is preferably in the range from 10 to 300 μ. Further, the distribution density of said network elements is at least 1,000, preferably at least 5,000, per cm² of the film surface. The distribution density of the network elements can be determined by counting the number of network elements present per unit area, as observed by means of a scanning electron microscope of 100 to 300 magnifications.

The polypropylene used in producing the translucent polypropylene film of the present invention includes not only a propylene homopolymer but also copolymers of propylene with minor amounts of other α-olefins, and is an isotactic polypropylene having 90% or more of the residue as extracted with boiling n-heptane for 8 hrs. said percentage representing the isotacticity of the polypropylene. The polypropylene may have any polymerization degree so far as it is melt-moldable, though it has a melt index of 0.3 to 30, preferably 0.5 to 20, as measured at 230° C. under a load of 2.16 kg. according to the method regulated in ASTM D1238-57T. Further, the polypropylene is preferably as pure as possible in view of its application purpose, and should not be incorporated with any additive other than a stabilizer, such as, for example, a β-type crystallization nucleating agent.

Another characteristic of the present invention is that the unstretched polypropylene molded article used in the production of the translucent polypropylene film of the present invention has, on at least one side, a surface layer having a K value, which represents the amount of β-type crystals present at a portion from the surface to a thickness of 10% in the thick-wall direction, of at least 0.1. Even when an unstretched polypropylene molded article having a surface layer of less than 0.1 in said K value is stretched under the aforesaid conditions, the desired translucent polypropylene film of the present invention cannot be obtained.

The said K value, which represents the amount of β-type crystals present in the surface layer of the above-mentioned unstretched polypropylene molded article, was calculated according to the method described on pages 135–137 of Makromolekul Chemie, Vol. 75 (1964). Further, the sample used to measure the said K value was prepared by freezing said unstretched molded article and then cutting by means of a microtome the surface layer of the frozen unstretched molded article at a portion from the surface to a thickness of 10% in the thick-wall direction.

In practicing the present invention, the unstretched polypropylene molded article having a surface layer composed of the specific crystal structure mentioned above may be prepared according to a process, by which a crystalline polypropylene containing no β-type crystallization nucleating agent is melt-extruded through a ring die or flat die attached to the tip of a thermoplasticization melt extruder to form a tube-like or sheet-like melt, which is then taken up by means of nip rollers while contacting at least one side of said melt with various medium such as used in the various methods mentioned below. It is desirable that average extrusion linear velocity of the resin when the resin is extruded from the die orifice, the temperature of the various medium, and the thickness of the unstretched molded article are controlled under specific conditions in order to make the above-mentioned unstretched polypropylene molded article.

The process of the present invention is explained below with reference to the accompanying drawings, in which.

In case an unstretched tubular polypropylene molded article is desired to be produced according to the process of the present invention, it is preferable to adopt any of the three processes mentioned below.

Figure 1:
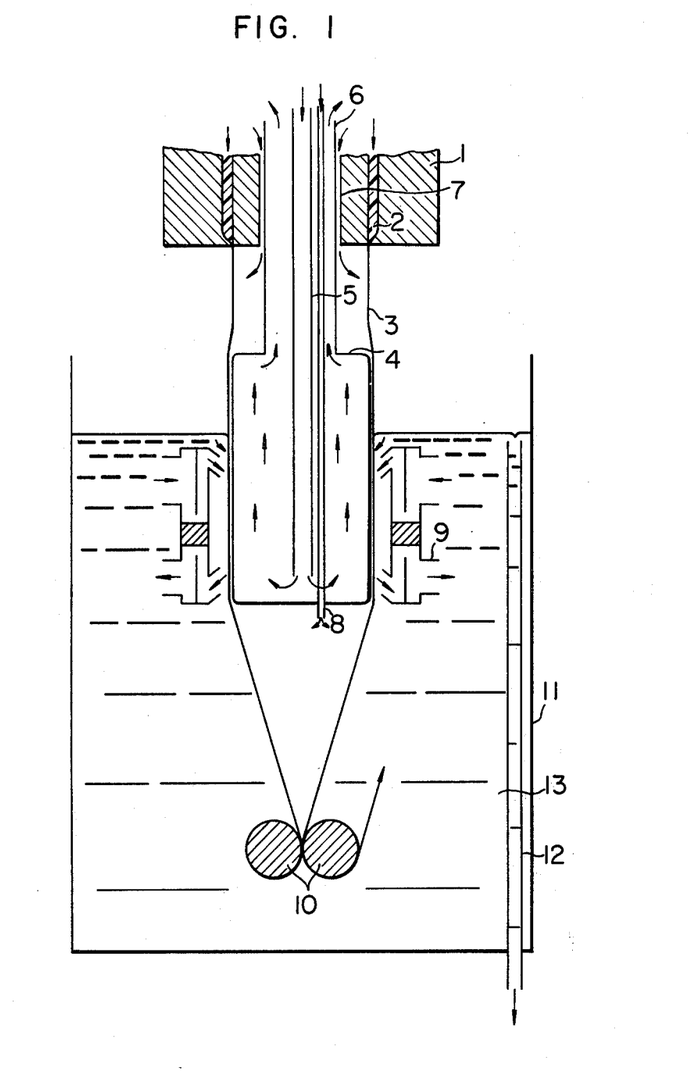
FIG. 1 is a drawing showing an embodiment of the process of the present invention.

The first process is a process in which a crystalline polypropylene containing no β-type crystallization nucleating agent is melt-extruded through a ring die to form a tubular melt, the inner surface of the said melt is slided in contact with a cylindrical member kept at a temperature in the range of 30° to 110° C. and, at the same time, the outer surface of the said melt is cooled by means of a cooling medium at a temperature below the temperature of the said cylindrical member, and then the resulting tube is taken up. As the tubular process mentioned above, it is preferable to adopt the process as shown in FIG. 1 by which the said crystalline polypropylene is melt-extruded through a ring die to form a tubular melt, the inner surface of the said melt is slided in contact with a cylindrical member kept at a temperature in the range of 30° to 110° C. and, at the same time, the outer surface of the said melt is cooled by means of a cooling liquid at a temperature below the temperature of the said cylindrical member, while maintaining the liquid surface of the said cooling liquid below the point of initiation of contact of the inner surface of the said melt with the said cylindrical member, and then the resulting tube is taken up. This process is a preferable process since an unstretched tubular polypropylene molded article having a K value at the surface layer portion of at least 0.1 can be produced with high efficiency.

As the material of the cylindrical member used in the production of the above-mentioned unstretched polypropylene molded article, there may be used any of usual metal, ceramic, glass, carbon or polymeric substance, and the shape of the surface of the said cylindrical member may be any of mirror-like, aventurine or textile-like shape. Further, it is necessary that the said cylindrical member is maintained at a temperature in the range of 30° to 110° C., preferably 50° to 100° C. If the temperature of the said cylindrical member is less than 30° C., the aforesaid K value at the surface layer of the resulting unstretched polypropylene molded article undesirably becomes less than 0.1. Even when such unstretched polypropylene molded article is stretched, the desired translucent polypropylene film of the present invention cannot be produced. If the temperature of the said cylindrical member exceeds 110° C., the aforesaid tubular melt cannot uniformly slide along the surface of the cylindrical member to make it impossible to produce a homogeneous unstretched polypropylene molded article. In order to maintain the cylindrical member at a temperature within the aforesaid temperature range, a medium such as air or water may be introduced into and discharged from the interior of the cylindrical member. In this manner, the outer wall of the cylindrical member is maintained at a temperature within the aforesaid range.

As the process for cooling the outer surface of the aforesaid tubular melt with a cooling medium below the temperature of the cylindrical member, there may be adopted any process using air, water or the like cooling medium. Considering the cooling efficiency of the tubular melt, however, the cooling medium is preferably a liquid medium, and the process using water is particularly preferable. When the cooling of the tubular melt with a liquid cooling medium is effected according to the process that the liquid surface of the cooling medium is maintained below the point of initiation of contact of the inner surface of the said tubular melt with the said cylindrical member, more preferably 5 mm to 30 cm lower than the said point of initiation of contact, it is possible to produce with high efficiency an unstretched tubular polypropylene molded article having a surface layer, in which the peculiar crystal structure mentioned previously is present in a specific proportion. An embodiment of the above-mentioned process is explained below with reference to FIG. 1.

In the first place, a crystalline polypropylene containing no β-type crystallization nucleating agent is fed to an extruder, and melt-extruded through the annular slit 2 of a ring die 1 to form a tubular melt 3. Subsequently, compressed air is introduced through a compressed air-introducing pipe 7 to expand the said tubular melt 3 to a diameter equal to or slightly greater than the outer diameter of a cylindrical member 4 kept at a temperature in the range of 30° to 110° C., and the inner surface of the tubular melt is slided in contact with the surface of the cylindrical member 4. At the same time, the outer surface of the tubular melt 3 is cooled with a cooling liquid below the temperature of the cylindrical member which has been placed in a vertically movable external cooling liquid tank 11, said liquid being maintained at a fixed liquid level in the tank by overflowing the liquid through an overflow pipe 12, and then the resulting tubular material is led downward. When the cooling liquid, at the time of cooling of the tubular material, is forcibly moved in the direction shown by the arrows in the drawing, or in the reverse direction, by means of a water ring 9 provided around the cylindrical member 4, the effect of cooling of the said tubular material can be displayed in an extremely stable state. This procedure, therefore, is a preferable one.

The interior of the above-mentioned cylindrical member 4 is equipped with a cooling liquid-introducing pipe 5 and a cooling liquid-dicharging pipe 6 which penetrate through the ring die 1, and is always maintained by means of the cooling liquid to a temperature within the aforesaid range.

Subsequently, the tubular material which has left the cylindrical member is further sent downward, while being filled with compressed air through a compressed air-introducing pipe 8 equipped at the lower part of the cylindrical member 4 so as not to be collapsed with the cooling liquid in the external cooling liquid tank 11, and then taken up through nip rolls 10.

The second process is a process by which a crystalline polypropylene containing no β-type crystallization nucleating agent is melt-extruded through a ring die to form a tubular melt, the inner surface of the said melt, while maintaining said surface at a temperature in the range of 130° to 200° C., is instantaneously or intermittently slided in contact with the outer periphery of one or more disc-like members having a slight roundness at the outer periphery, and, at the same time, the outer surface of the said melt is cooled with a cooling medium, and then the resulting tubular material is taken up.

As the material of the disc-like member used in the production of the said unstreatched polypropylene molded article, there may be used usual metal, ceramic, glass or polytetrafluoroethylene which may or may not be reinforced with carbon, asbestos or the like. Generally, the sharper the roundness of the outer periphery of the said disc-like member, the greater the effect of sliding of the tubular melt in contact with the disc-like member to make it possible to obtain an unstretched polypropylene molded article having a larger aforesaid K value. On the other hand, however, the travelling stability of the tubular melt is lowered. It is therefore desirable that the outer periphery of the said disc-like member has a roundness of 0.05 to 10 mm, preferably 0.1 to 3 mm, in terms of radius of curvature. Further, the larger the number of the said disc-like member, the greater the effect of sliding of the tubular melt in contact with the disc-like member. On the other hand, however, the travelling stability of the tubular melt is lowered. Accordingly, the number of said disc-like members is 1 to 10, preferably 3 to 7.

In the production of the aforesaid unstretched polypropylene molded article, the inner surface of the said tubular melt to be slided in contact with at least one of the above-mentioned disc-like members is required to be maintained at a temperature in the range of 130° to 200° C., preferably 150° to 200° C. If the temperature of the inner surface of the said melt is out of the above-mentioned temperature range, it becomes impossible to obtain an unstretched molded article having, on at least one side, a surface layer having the aforesaid K value of at least 0.1. As a method for the measurement of the temperature of the inner surface of the said melt, there is adopted the procedure that a thermocouple is provided in the close vicinity of each disc-like member, which contacts with the said melt, and the detecting terminal of the thermocouple is contacted with the inner surface of said melt to confirm whether or not the temperature of at least one of the thermocouples is in the aforesaid temperature range.

The position, at which the disc-like member or members are to be installed in order to bring the temperature of the inner surface of said melt to a temperature within the aforesaid range, varies depending on various molding conditions and the kind of the external cooling medium. When water is used as the external cooling medium, however, it is preferable that the part of at least one of the disc-like members at which the member contacts the melt is positioned at a position from the water surface of the external cooling water bath to 500 mm. below the water surface, preferably from 10 mm. below the water surface to 200 mm. below the water surface.

In order to enhance the effect of sliding of the disc-like member in contact with the tubular melt in the preparation of the above-mentioned unstretched polypropylene molded article, and in order to obtain an unstretched polypropylene molded article having, on at least one side, a surface layer of at least 0.1 in the aforesaid K value, it is necessary that the travelling speed of the said melt at the time of sliding in contact with the said disc-like member is at least 15 mm/sec., preferably at least 40 mm/sec. Such travelling speed is calculated from the speed of the tube take-up rolls.

As the external cooling medium used in the preparation of the above-mentioned unstretched polypropylene molded article, there may be employed a gas such as air or nitrogen, or a liquid such as water, mercury or ethylene glycol. Among these, the liquid, particularly water, is most preferable.

An embodiment of the above-mentioned process is explained below with reference to FIG. 2.

In the first place, a crystalline polypropylene containing no β-type crystallization nucleating agent is fed to an extruder, and meltextruded downward through the annular slit 15 of a ring die 14 to form a tubular melt 16. Thereafter, the inner surface of the said melt, while maintaining the temperature thereof at 130° to 200° C., is instantaneously or intermittently slided in contact with the outer periphery of one or more of disc-like members 17, and, at the same time, the outer surface of the said melt is cooled with cooling water 19 in a cooling water tank 18, and then the resulting tube is taken up through nip rolls.

The third process for preparing the above-mentioned unstretched polypropylene molded article according to the tubular process is a process in which a crystalline polypropylene containing no β-type crystallization nucleating agent is melt-extruded through a ring die under such conditions that the resin temperature at the time of extrusion from the die orifice is 230° C. or less and the average extrusion linear velocity from the die orifice is 1.5 cm/sec. or more to form a tubular melt, the outer surface of the said melt is contacted with a medium having a temperature of 45° C. or more, and the resulting tube is taken up while contacting the inner surface thereof with a medium having a temperature less than the temperature of the aforesaid medium.

In the preparation of the above-mentioned unstretched polypropylene molded article, it is necessary to satisfy such conditions that the resin temperature at the time of extrusion from the die orifice is 230° C. or less, preferably 210° C. or less, and the average extrusion linear velocity of the resin from the die orifice is 1.5 cm/sec or more, preferably 2.5 cm/sec or more. The average extrusion linear volocity V (cm/sec) when the resin is extruded from the die is determined by the equation, $$V = Q/0.75 A$$

wherein Q is the weight of the resin extruded per unit time (g/sec); A is the cross-section area of the die orifice ($cm^2$); and the value "0.75" is the density ($g/cm^3$) of the resin melt. That is, it is indispensable to impart a shearing force of more than a definite degree to the resin melt at the time of extrusion from the die orifice. If the resin temperature at the time of extrusion from the die orifice and the average extrusion linear velocity when the resin is extruded from the die orifice are out of the above-mentioned ranges, it becomes impossible to obtain an unstretched polypropylene molded article having a surface layer having a K value of at least 0.1 as mentioned previously.

The medium to be contacted with the tubular melt at the time of preparation of the above-mentioned unstretched polypropylene molded article may be used in the form of gas, liquid or solid. As the gas, there may be used air or nitrogen. As the liquid, there may be used water, mercury or ethylene glycol, but the use of water is most advantageous from the practical standpoint. As the solid, there may be used usual metal, ceramics, glass, carbon or polymeric substance. The shape of the surface of said solid may be mirror-like, aventurine or textile-like shape.

In the process mentioned above, the temperature of the medium to be contacted with the outer surface of the tubular melt is required to be at least 45° C., preferably at least 50° C., and the temperature of the medium to be contacted with the inner surface of the said melt is required to be less than the temperature of the aforesaid medium. If the temperatures of the said two media are out of the above-mentioned temperature ranges, it becomes impossible to obtain an unstretched polypropylene molded article having a surface layer having a K value of at least 0.1 as mentioned previously. Considering the stable moldability of the tube, the upper limit temperature of the medium to be contacted with the outer surface of the said melt is 130° C., and that of water, when this is used as the medium, is 90° C.

An embodiment of the above-mentioned process is explained below with reference to FIG. 3.

In the first place, a crystalline polypropylene containing no β-type crystallization nucleating agent is fed to an extruder, and melt-extruded through the annular slit 21 of a ring die 20 under such conditions that the resin temperature at the time of extrusion from the die orifice is 230° C. or less and the average extrusion linear velocity when the resin is extruded from the die orifice is 1.5 cm/sec or more to form a tubular melt 22. Subsequently, compressed air is introduced through a compressed air-introducing pipe 26 to expand the said melt 22 to a diameter equal to or slightly greater than the outer diameter of a cylindrical member 23 suspended below the aforesaid ring die 20, and the inner surface of the melt 22 is slided in contact with the surface of the cylindrical member 23. At the same time, the outer surface of the tubular melt 22 is contacted and cooled with a liquid medium kept above 45° C. which has been charged into a vertically movable liquid medium tank 30 and maintained at a fixed liquid level by overflowing the medium through an overflow pipe 31, and then the resulting tubular material is led downward. In this case, when the liquid medium is forcibly moved in the direction shown by the arrows in the drawing, or in the reverse direction, by means of a water ring 28 provided around the cylindrical member 23, the effect of contact of the aforesaid tubular melt 22 with the liquid medium can be displayed in an extremely stable state. This procedure, therefore, is a preferable procedure. The interior of the above-mentioned cylindrical member 23 is equipped with a medium-introducing pipe 24 and a medium-discharging pipe 25 which penetrate through the ring die 20, and is always maintained at less than 45° C. by means of the medium. Subsequently, the tubular material which has left the cylindrical member 23 is further sent downward, while being filled with compressed air injected through a compressed air-injecting pipe 27 so as not to be collapsed with the external liquid medium, and then taken up through nip rolls 29.

Figure 4:
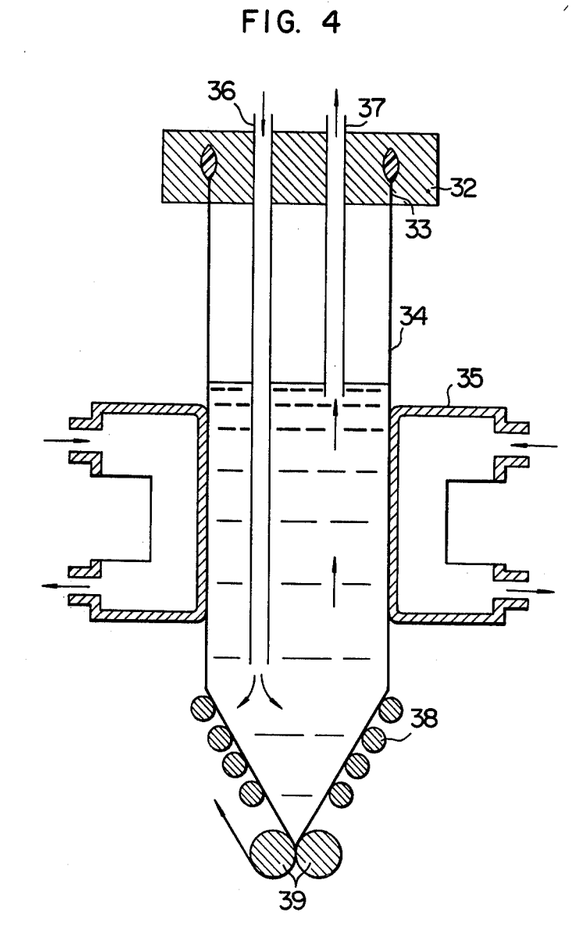

Another embodiment of the above-mentioned process is explained below with reference to FIG. 4.

A crystalline polypropylene containing no β-type crystallization nucleating agent is fed to an extruder, and melt-extruded through the annular slit 33 of a ring die 32 under such conditions that the resin temperature at the time of die extrusion is 230° C. or less and the average extrusion linear velocity is 1.5 cm/sec or more to form a tubular melt 34. Subsequently, the inner surface of the said melt 34 is contacted with a liquid medium kept at less than 45° C. which is introduced and discharged through a liquid medium-introducing pipe 36 and a liquid medium-discharging pipe 37 which penetrate through the ring die 32. At the same time, the outer surface of the said melt 34 is led downward while being contacted with a cylindrical member 35 provided around the said outer surface. The interior of the said cylindrical member 35 is maintained at above 45° C. by introducing or discharging the medium in the direction shown by the arrows in the drawing or in the reverse direction. Thereafter, the tubular material which has left the cylindrical member 35 is sent downward while being supported by guide rolls 38, and then taken up through nip rolls 39.

On the other hand, in case an unstretched sheet-like polypropylene molded article is desired to be prepared according to the process of the present invention using a flat die, it is preferable to adopt the process mentioned below.

That is, a crystalline polypropylene containing no β-type crystallization nucleating agent is melt-extruded through the slit of a flat die to form a sheet-like melt, one side of the said melt is contacted with a hot roll kept at a temperature in the range of 30° to 130° C., while the other side of the said melt is cooled with a medium kept at a temperature below the temperature of the said hot roll, and then the resulting sheet is taken up.

As the material of the hot roll to be contacted with one side of the sheet-like melt in the above-mentioned process, there may be used any of usual metal, ceramics, glass, carbon and polymeric substance. However, ceramics or glass is preferable to metal, and an organic substance such as polymeric substance is more preferable. Further, the shape of the surface of the said roll may be any of mirror-like, aventurine or textile-like shape.

In the above-mentioned process for preparing the unstretched sheet-like polypropylene molded article, the said hot roll is required to be maintained at a temperature in the range of 30° to 130° C., preferably 40° to 100° C. If the temperature of the said hot roll is less than 30° C., the K value of the surface layer of the resulting unstretched polypropylene molded article undesirably becomes less than 0.1. Further, if the temperature of the said hot roll exceeds 130° C., the production steps become unstable to make it impossible to obtain a homogeneous sheet.

As the process for cooling the other side of the aforesaid sheet-like melt with a medium kept at a temperature below the temperature of the hot roll, there may be adopted any process using air, water or cooling rolls. Considering the cooling efficiency, however, the process using air or cooling rolls is preferable.

For the preparation of an unstretched sheet-like polypropylene molded article according to the cooling roll process, there may be adopted the process shown in FIG. 5, in which one side of a sheet-like melt 41 melt-extruded through a flat die 41 is contacted with silicon rubber hot rolls 43 and 45, while the other side thereof is contacted with hard chromium-plated cooling rolls 42 and 44 kept below the temperature of said hot rolls. For the preparation of an unstretched sheet-like polypropylene molded article according to the water-cooling process, there may be adopted the process shown in FIG. 6, in which one side of a sheet-like melt 47 melt-extruded through a flat die 46 is contacted with a hot polytetrafluoroethylene-made roll 48, while the other side thereof is cooled by contact with cooling water 49 kept at a temperature below the temperature of said hot roll 48. If the temperature of the cooling medium used in the above-mentioned process is higher than that of the hot roll, spots are formed on the surface of the resulting unstretched polypropylene molded article to make it impossible to form a homogeneous unstretched molded article.

The thickness of the unstretched polypropylene molded article obtained according to any of various processes as mentioned above is at least 200 μ, preferably at least 350 μ.

When such an unstretched polypropylene molded article is biaxially stretched under specific conditions, it is possible to obtain a translucent polypropylene film having the specific surface structure as aimed at by the present invention. As the stretching process in this case, there may be employed any of flat simultaneous or successive biaxially stretching process or tubular biaxially stretching process. The stretching conditions in the case of such biaxial stretching may be so established that the stretching temperature at the stretch initiation point is a temperature in the range of 145° to 176° C. and the stretch ratio in one direction is less than 8 times. The stretch initiation point referred to herein means the portion where the decrease in thickness of the unstretched molded article is substantially initiated in the stretching step which, in the case of flat simultaneous biaxially stretching process, corresponds to the portion at which the distance between the facing left and right clips initiates to increase; in the case of flat successive biaxially stretching process, corresponds to the portion at which the thickness of the film initiates to decrease in the longitudinally stretched portion; and in the case of tubular biaxially stretching process, corresponds to the portion at which the diameter of the tube passing through the stretching tower heater initiates to increase. If the stretching temperature at the stretch initiation point is less than 145° C., it becomes impossible to obtain such excellent, translucent, polypropylene film dense in inner structure and roughened at the surface as aimed at by the present invention. On the other hand, if the stretching temperature at the stretch initiation point is higher than 176° C., no stable stretching can be effected, and it becomes impossible to obtain such excellent, translucent, polypropylene film roughened at the surface as aimed at by the present invention.

Prior to the biaxial stretching under the above-mentioned conditions, the aforesaid unstretched polypropylene molded article is preheated. When the preheating time from the initiation point of preheating to the stretch initiation point is less than 150 seconds in said preheating, the translucent polypropylene film of the present invention can be produced with high efficiency. If the said preheating time is more than 150 seconds, it becomes impossible to obtain such an excellent, translucent polypropylene film dense in inner structure and roughened at the surface as aimed at by the present invention.

At the time of biaxial stretching, the stretch ratio in one direction is required to be less than 8 times. If the stretch ratio in one direction is 8 times or more, it becomes impossible to obtain such excellent, translucent polypropylene film dense in inner structure and roughened at the surface as aimed at by the present invention. The lower limit of the stretch ratio is regulated by a necking phenomenon, in substance. A stretch ratio necessary to complete the necking varies depending on the stretching temperature and the like. Generally, however, the stretch ratio in one direction is required to be 1.2 or more and less than 8 times, preferably 3 to 6 times.

The translucent polypropylene film of the present invention which is obtained by the process mentioned above is excellent in mechanical properties, quite dense in inner structure, high in airtightness and favorable in haze, and the surface thereof has an efficiently roughened fine uneven structure or fibril-like network structure composed of the peculiar network elements mentioned previously. Moreover, the translucent polypropylene film of the present invention contains no β-type crystallization nucleating agent, and hence can be used as a film in a field where sanitation is argued, e.g. as a film for packing medicines, hygienic materials and foods. Further, because of its peculiar inner structure, the translucent polypropylene film of the present invention, when impregnated with an insulating oil, shows an excellent impregnancy for the insulating oil which has not been seen in the conventional polypropylene film. Moreover, the translucent polypropylene film of the present invention is quite dense in inner structure, contains no other additives such as crystallization nucleating agent and thus is high in purity, so that when it is used as a dielectric layer for condenser, it is possible to obtain a condenser, which does not generate corona discharge derived from fine voids in the interior of the film itself, and which can sufficiently be prevented from dielectric breakdown due to corona discharge under a low voltage derived from voids in the insulating oil-unimpregnated portion inside the condenser element. In addition, the polypropylene film of the present invention can be used as a film for electric cables, transformers and other various electrical appliances which are required to be compact in size, light in weight and long in durability, and thus displays excellent characteristic properties.

The translucent polypropylene film of the present invention has excellent dielectric characteristics, so that when utilized as a film for electrical appliances, particularly as a dielectric layer for wet or dry type condensers, it can sufficiently display said characteristics. When used for said wet or dry type condensers, the polypropylene film of the present invention can take any of the following three types:

First Type

The translucent polypropylene film of the present invention is formed into a dielectric layer, which is then convoluted together with an electrode foil and impregnated with an insulating oil to produce an oil-impregnated film condenser.

Second Type

The translucent polypropylene film of the present invention is formed into a dielectric layer, a thin metal film layer for electrode is formed by vacuum metallizing or the like on at least one side of said layer, and the resulting film is convoluted and then impregnated with an insulating oil to produce an oil-impregnated film condenser.

Third Type

The translucent polypropylene film of the present invention is formed into a dielectric layer, a thin metal film layer for electrode is formed by vacuum metallizing or the like on at least one side of said layer, and then the resulting film is convoluted to produce a dry type film condenser.

The present invention is illustrated in detail below with reference to examples.

EXAMPLE 1

A highly crystalline polypropylene having an isotacticity index of 95% and a melt index of 3.0 was fed to the extruder shown in FIG. 1, and then melt-extruded downward through a ring die 1 kept at 230° C., which had been attached to the tip of the said extruder, to form a tubular melt 3. Before the said melt 3 had solidified, the inner surface of the said melt 3 was slided in contact with a 150 mesh chromium-plated aventurine-finished cylindrical member 4 maintained at 70° C. by means of a heating medium. At the same time, the said melt 3 was led downward while cooling the outer surface thereof with water 13 at 8° C. in an external cooling water tank 11, and then taken up by means of nip rolls 10 to obtain an unstretched tubular molded article of 600 μ in thickness. In this case, the water surface level was maintained 30 mm. lower than the point of initiation of contact of the tubular melt 3 with the cylindrical member 4. The K value at a portion from the inner surface of the said unstretched molded article to a thickness of 60 μ was measured according to the method mentioned previously to obtain a value of 0.2. On the other hand, the K value at a portion from the outer surface of the said unstretched molded article to a thickness of 540 μ was 0.02.

The thus obtained unstretched tubular molded article was biaxially stretched according to tubular biaxially stretching process under such conditions that the temperature of the stretch initiation point was 153° C. and the stretch ratios in both longitudinal and transverse directions were 6 times, and then subjected to heat treatment at 140° C. for 30 seconds to obtain a biaxially stretched polypropylene film having a thickness of 18μ. On one side of the said biaxially stretched film was present a surface layer having a network structure composed of an aggregate of network elements consisting of fibril-like materials, creasy materials and film-like materials. The distribution density of the said network elements was 70,000 to 90,000 per $cm^2$ of the film surface, and the size of the network elements was 10 to 150μ.

EXAMPLE 2

Using the same highly crystalline polypropylene as in Example 1, unstretched tubular molded articles of 600μ in thickness were prepared under the same conditions as in Example 1, except that the temperature of the cylindrical member 4 was varied as shown in Table 1. The K values at portions (A) from the inner surfaces of these unstretched molded articles to thicknesses of 10% in the thick-wall direction and those of the remaining portions (B) were measured to obtain such results as shown in Table 1.

Subsequently, the unstretched tubular molded articles were biaxially stretched under the same conditions as in Example 1, and then subjected to heat treatment at 140° C. for 30 seconds to obtain biaxially stretched polypropylene films of 18μ in thickness. Among these, the film of Run No. 1 had a substantially smooth surface, but on one side of each of other films was present a surface layer having a network structure composed of an aggregate of network elements consisting of fibril-like materials, creasy materials and film-like materials.

The distribution densities and sizes of the network elements of these films were as shown in Table 1.

Table 1

| Run No. | Temperature of cylindrical member (° C.) | K valve at portion (A) | density of net-K valve at portion (B) | Distribution network elements (number/cm$^2$) | Size of elements ($\mu$) |
|---|---|---|---|---|---|
| 1 | 25 | 0.05 | 0.01 | — | — |
| 2 | 30 | 0.1 | " | 80,000–100,000 | 10–100 |
| 3 | 80 | 0.25 | 0.03 | 60,000–80,000 | 10–150 |
| 4 | 92 | 0.34 | 0.05 | 50,000–70,000 | 10–200 |
| 5 | 110 | 0.45 | " | 30,000–50,000 | 10–200 |

EXAMPLE 3

Using the same highly crystalline polypropylene as in Example 1, unstretched tubular molded articles of 600$\mu$ in thickness were prepared under the same conditions as in Example 1, except that the surface material and temperature of the cylindrical member 4 were varied as shown in Table 2. The K values at portions (A) from the inner surfaces of these unstretched molded articles to thicknesses of 10% in the thick-wall direction and those of the remaining portions (B) were measured to obtain such results as shown in Table 2.

Subsequently, the unstretched tubular molded articles were biaxially stretched under the same conditions as in Example 1, and then subjected to heat treatment at 140° C. for 30 seconds to obtain biaxially stretched films of 18$\mu$ in thickness. Among these, the films of Run Nos. 1 and 5 had substantially smooth surfaces, but on one side of each of other films was present a surface layer having a network structure composed of an aggregate of network elements consisting of fibril-like materials, creasy materials and film-like materials. The distribution densities and sizes of the network elements of these films were as shown in Table 2.

110 mm. below the water surface of said tank. The temperature of the inner surface of the tubular melt 16 at the point of contacting the top of the five disc-like members 17 was 218° C., the temperature of the inner surface of the melt at the point of contacting the lower-most member was 171° C., and the temperatures of the inner surface of the melt at the points contacting the lower four disc-like members 17 were in the range of 130° to 200° C.

The K value at a portion from the inner surface of the said unstretched molded article to a thickness of 64$\mu$ was 0.15, while the K value at a portion from the outer surface thereof to a thickness of 576$\mu$ was 0.03.

Sunsequently, the unstretched tubular molded article was biaxially stretched under the same conditions as in Example 1, and then subjected to heat treatment at 140° C. for 30 seconds to obtain a biaxially stretched film of 20$\mu$ in thickness. On one side of the said biaxially stretched film was present a surface layer having a network structure composed of an aggregate of network elements consisting of fibril-like materials, creasy materials and film-like materials. The distribution density of said network elements was 80,000 to 100,000 per cm$^2$ of the film surface, and the size of the network elements was 10 to 100$\mu$.

Table 2

| Run No. | Surface material of cylindrical member | Temperature of cylindrical member (° C.) | K value at portion (A) | K value at portion (B) | Distribution density of network elements (number/cm$^2$) | Size of network elements ($\mu$) |
|---|---|---|---|---|---|---|
| 1 | Cloth, 100 mesh | 20 | 0.05 | 0.01 | — | — |
| 2 | " | 50 | 0.19 | " | 50,000–70,000 | 10–200 |
| 3 | " | 82 | 0.27 | 0.04 | 30,000–50,000 | " |
| 4 | Polytetrafluoroethylene | 50 | 0.20 | 0.02 | 50,000–70,000 | " |
| 5 | Glass wool | 25 | 0.06 | 0.01 | — | — |
| 6 | " | 52 | 0.17 | " | 50,000–70,000 | 10–200 |

EXAMPLE 4

Figure 2:
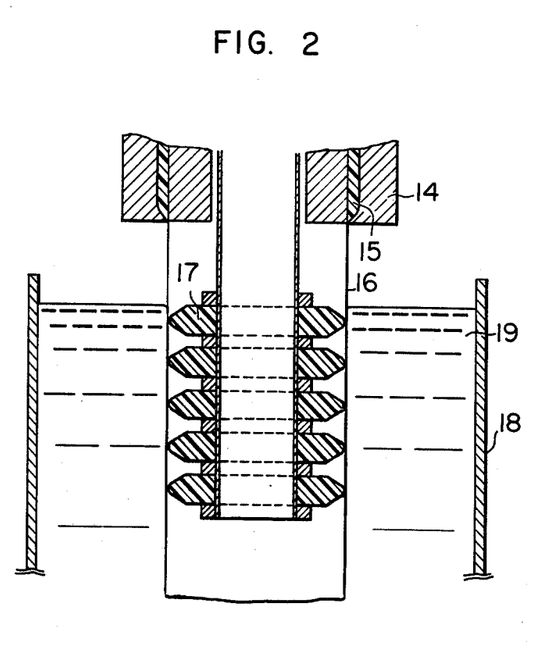
FIG. 2 is a drawing showing another embodiment of the cooling means adopted in the present process.

The same highly crystalline polypropylene as in Example 1 was fed to the extruder shown in FIG. 2, and then melt-extruded downward through a ring die 14 kept at 210° C., which had been attached to the tip of the extruder, to form a tubular melt 16. This tubular melt 16 was taken up by means of take-up rolls at a take-up rate of 4 m/min., while cooling the outer surface thereof with cooling water 19 at 10° C. in a cooling water tank 18 provided below the ring die, and while sliding the inner surface thereof in contact with five disc-like members 17, to obtain an unstretched tubular molded article of 640$\mu$ in thickness.

Each of the said disc-like members was made of carbon-incorporated polytetrafluoroethylene, and the roundness at the outer periphery thereof was 0.5 mm. in terms of radius of curvature. The position of the outer periphery of the upper-most disc-like member was 20 mm. below the water surface of the cooling water tank 18, while that of the lower-most disc-like member was

EXAMPLE 5

An unstretched tubular molded article of 450$\mu$ in thickness was prepared in the same manner as in Example 4, except that the temperature of the ring die 14 was varied to 230° C., the temperature of the cooling water 19 in the cooling water tank 18 was varied to 70° C. and the roll take-up rate was varied to 5.5 m/min. In this case, the temperature of the inner surface of the tubular melt 16 at the point of contacting the top of the five disc-like members 17 was 236° C., the temperature of the inner surface of the melt at the point of contacting the lower-most member was 163° C., and the temperatures of the inner surface of the melt at the points contacting the lower four members were in the range of 130° to 200° C.

The K value at a portion from the inner surface of the said unstretched molded article to a thickness of 45$\mu$ was 0.24, while the K value at a portion from the outer surface thereof to a thickness of 405$\mu$ was 0.06.

Subsequently, the unstretched tubular molded article was biaxially stretched under the same conditions as in Example 1, and then subjected to heat treatment at 140° C. for 30 seconds to obtain a biaxially stretched polypropylene film of 15μ in thickness. On one side of the said biaxially stretched film was present a surface layer having a network structure composed of an aggregate of network elements consisting of crater-like materials. The distribution density of the said network elements was 50,000 to 70,000 per cm² of the film surface, and the size of the network elements was 50 to 200μ.

EXAMPLE 6

Figure 3:
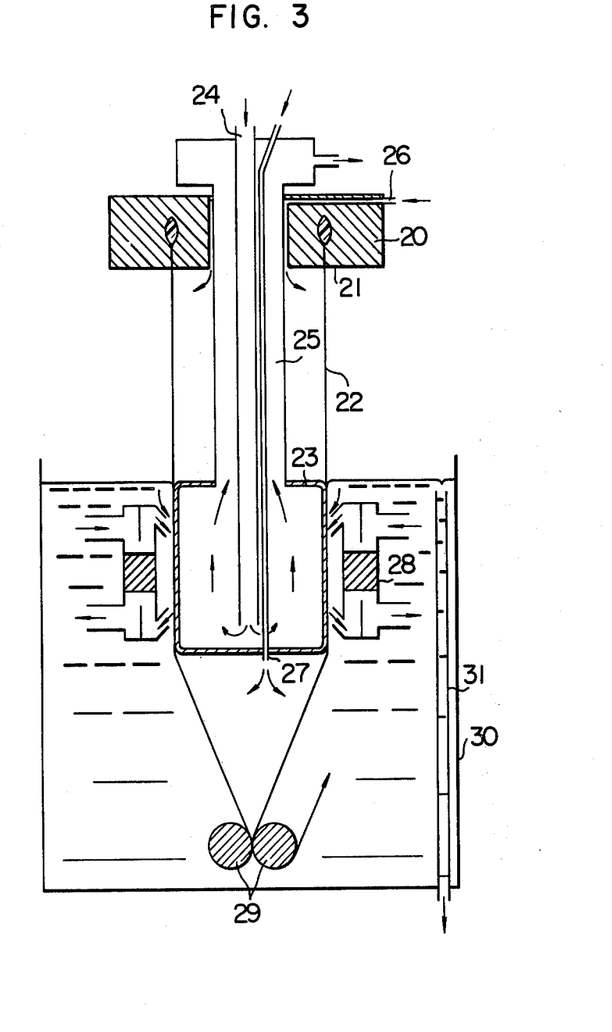
FIGS. 3 and 4 are drawings showing two other embodiments of the process of the present invention.

The same highly crystalline polypropylene as in Example 1 was fed to an extruder, and then melt-extruded downward through the ring die 20 shown in FIG. 3 under such conditions that the resin temperature at the time of extrusion from the die orifice was 205° C. and the average extrusion linear velocity from the die orifice was 2.9 cm/sec, to obtain a tubular melt 22. The outer surface of the said tubular melt 22 was contacted with hot water at 80° C. and, at the same time, the inner surface thereof was cooled while contacting with a 200 mesh chromium-plated, aventurine-finished cylindrical member 23 which was always kept at 5° C. by introducing and discharging a medium through a medium-introducing pipe 24 and a medium-discharging pipe 26 penetrating through the ring die 20. The thus treated tubular melt 22 was led downward and then taken up by means of nip rolls 29 to obtain an unstretched tubular molded article of 600μ in thickness.

The K value at a portion from the outer surface of the said unstretched molded article to a thickness of 60μ was 0.15, while the K value at a portion from the inner surface thereof to a thickness of 540μ was 0.02.

Subsequently, the unstretched tubular molded article was biaxially stretched under the same conditions as in Example 1, and then subjected to heat treatment at 140° C. for 30 seconds to obtain a biaxially stretched polypropylene film of 18μ in thickness. On one side of the said biaxially stretched film was present a surface layer having a network structure composed of an aggregate of network elements consisting of fibril-like materials, creasy materials and film-like materials. The distribution density of the said network elements was 80,000 to 100,000 per cm² of the film surface, and the size of the network elements was 10 to 100μ.

EXAMPLE 7

Unstretched tubular molded articles having various thicknesses were prepared under the same conditions as in Example 6, except that the resin temperature at the time of extrusion from the die orifice and the average extrusion linear velocity from the die orifice were varied as shown in Table 3. The K values at portions from the outer surfaces of the unstretched molded articles to thicknesses of 10% in the thickwall direction were as shown in Table 3.

Subsequently, the unstretched tubular molded articles were biaxially stretched under the same conditions as in Example 1, and then subjected to heat treatment at 140° C. for 30 seconds to obtain biaxially stretched polypropylene films having such various thicknesses as shown in Table 3. Among these, the biaxially stretched films of Run Nos. 1 and 3 had substantially smooth surfaces, but on one side of each of other films was present a surface layer having a network structure composed of an aggregate of network elements consisting of fibril-like materials, creasy materials and film-like materials. The distribution densities and sizes of the network elements of these films were as shown in Table 3.

Table 3

| Run No. | Resin temperature at the time of extrusion from die orifice (° C.) | Average extrusion linear velocity from die orifice (cm/sec) | Thickness of unstretched molded article (μ) | K value | Thickness of stretched film (μ) | Distribution density of network elements (number/cm²) | Size of network elements (μ) |
|---|---|---|---|---|---|---|---|
| 1 | 232 | 2.9 | 600 | 0.07 | 18 | — | — |
| 2 | 225 | " | " | 0.12 | " | 80,000–100,000 | 10–100 |
| 3 | 205 | 1.3 | 270 | 0.08 | 9 | — | — |
| 4 | " | 1.8 | 370 | 0.12 | 12 | 100,000–110,000 | 10–100 |

EXAMPLE 8

Unstretched tubular molded articles of 600μ in thickness were prepared under the same conditions as in Example 6, except that the temperature of the water contacting with the outer surface of the tubular melt 22 was varied as shown in Table 4.

The K values at portions from the outer surfaces of these unstretched molded articles to thicknesses of 60μ were as shown in Table 4.

Table 4

| Run No. | Temperature of water (° C.) | K value |
|---|---|---|
| 1 | 40 | 0.08 |
| 2 | 50 | 0.12 |

Subsequently, the unstretched molded articles were biaxially stretched under the same conditions as in Example 1, and then subjected to heat treatment at 140° C. for 30 seconds to obtain biaxially stretched polypropylene films of 15μ in thickness. The biaxially stretched film of Run No. 1 had a substantially smooth surface, but on one side of the biaxially stretched film of Run No. 2 was present a surface layer having a network structure composed of an aggregate of network elements consisting of fibril-like materials, creasy materials and film-like materials. The distribution density of said network elements was 100,000 to 110,000 per cm² of the film surface, and the size thereof was 10 to 100μ.

EXAMPLE 9

Figure 5:
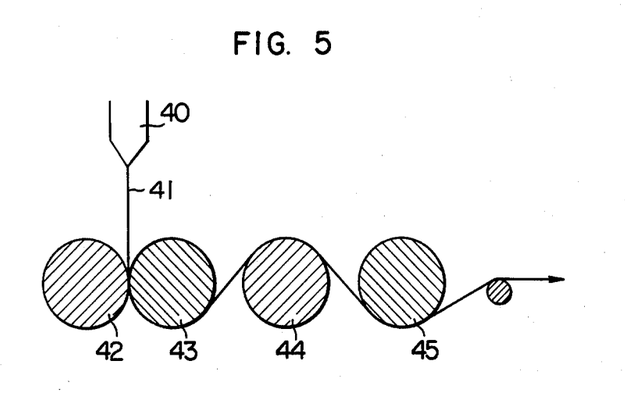
FIGS. 5 and 6 are drawings showing two other cooling means adopted in the present process.

The same highly crystalline polypropylene as in Example 1 was fed to an extruder having a screw diameter of 40 mm., and then melt-extruded through the flat die 40 (slit clearance 1.0 mm., slit width 30 cm.) shown in FIG. 5, which had been attached to the tip of the said extruder, to form a sheet-like melt 41. This sheet-like melt 41 was taken up, while contacting one side thereof with silicon rubber hot rolls 43 and 45 kept at 65° C. and while contacting the other side thereof with hard chromium-plated cooling rolls 42 and 44 kept at 10° C., to obtain an unstretched sheet-like molded article of about 500μ in thickness.

The K value at a portion from the side of said molded article contacted with the hot rolls 43 and 45 to a thickness of 50μ was 0.18, while the K value at a portion from the other side of the molded article contacted with the cooling rolls 42 and 44 to a thickness of 450μ was 0.04.

Subsequently, the unstretched molded article was cut into a test piece of 6 × 6 cm in size, and the test piece was fed to a flat process successively biaxially stretching machine, biaxially stretched under the same stretching conditions as in Example 1, and then subjected to heat treatment at 140° C. for 30 seconds to obtain a biaxially stretched polypropylene film of 15μ in thickness. On one side of the said biaxially stretched film was present a surface layer having a network structure composed of an aggregate of network elements consisting of fibril-like materials, creasy materials and film-like materials. The distribution density of the said network elements was 10,000 to 20,000 per cm² of the film surface, and the size thereof was 10 to 250μ.

EXAMPLE 10

Figure 6:
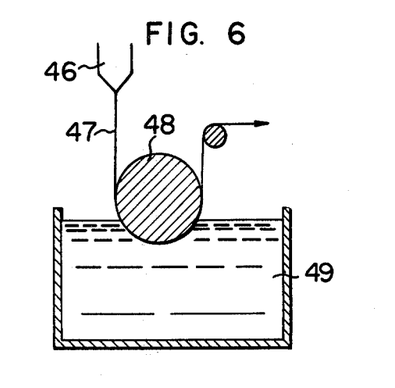

The same highly crystalline polypropylene as in Example 1 was fed to an extruder having a screw diameter of 25 mm., and then melt-extruded through the flat die 46 (slit clearance 1.0 mm., slit width 15 cm.) shown in FIG. 6, which had been attached to the tip of the said extruder, to form a sheet-like melt 47. This sheet-like melt 47 was taken up, while contacting one side thereof with a hot polytetrafluoroethylene-made roll 48 kept at such various temperatures as shown in Table 5 and while contacting the other side thereof with cooling water 49 kept at 5° C., to obtain unstretched sheet-like molded articles of about 600μ in thickness. The relation between the temperatures of the hot roll and the K values of the thus obtained unstretched molded articles was as shown in Table 5.

Subsequently, the unstretched molded articles were cut into a test pieces of 6 × 6 cm in size, and the test pieces were individually fed to a flat process simultaneous biaxially stretching machine, biaxially stretched under the same stretching conditions as in Example 1, and then subjected to heat treatment at 140° C. for 30 seconds to obtain biaxially stretched polypropylene film of 18μ in thickness. Among these, the biaxially stretched film of Run No. 1 had a substantially smooth surface, but on one side of each of other films was present a surface layer having a network structure composed of an aggregate of network elements consisting of fibril-like materials, creasy materials and film-like materials. The distribution densities and sizes of the network elements of these films were as shown in Table 5.

EXAMPLE 11

A polypropylene having an isotacticity index of 95%, an ash content of 25 p.p.m., as measured by burning the polypropylene into ash for 2 hours in a mixed liquid comprising sulfuric acid and glacial acetic acid, and a melt index of 3.3 was fed to an extruder, and then melt-extruded through the ring die 1 (lip clearance 1.0 mm.) shown in FIG. 1, under such conditions that the resin temperature at the time of extrusion from the die orifice was 210° C. and the average extrusion linear velocity from the die orifice was 3.6 cm/sec, to form a tubular melt 3. The inner surface of this tubular melt 3 was slided in contact with a hard chromium-made cylindrical member 4 having a 200 mesh aventurine-finished surface which had been heated to 70° C. At the same time, the outer surface of the said melt 3 was quickly cooled with water 13. Subsequently, the tubular melt 3 was taken up at a rate of 4.4 m/min to obtain an unstretched tubular molded article. This unstretched molded article was cut at a portion from the inner surface to a thickness of 10% in the thick-wall direction, and the K value thereof was measured to obtain a value of 0.18. On the other hand, the K value of the remaining portion after cutting was 0.03.

Subsequently, the unstretched molded article was biaxially stretched according to tubular biaxially stretching process under such conditions that the stretch ratios in both longitudinal and transverse directions were 6 times, and the stretching temperature of stretch initiation point and the preheating time were varied as shown in Table 6, and then subjected to heat treatment at 140° C. for 30 seconds to obtain biaxially stretched polypropylene films of 15μ in thickness. Among these, the biaxially stretched films of Run Nos. 1 and 5 in Table 6 had substantially smooth surfaces, but on one side of each of other films was present a surface layer having a network structure composed of an aggregate of network elements consisting of fibril-like materials, creasy materials and film-like materials. The distribution sitribution densities and sizes of the network elements of these films were as shown in Table 6.

Further, the films were measured in haze and in oil penetration height by dipping the films in an oil. The results obtained are also shown in Table 6.

The haze was measured according to JIS K-6714. The measurement of the oil penetration height was carried out in such a manner that the surfaces of each film more favorable in roughened state were superposed each other, the thus treated films was wound around a glass tube of 50 mm. in diameter, the glass wound with the films was erected in a petri dish, an oil (KIS 500, produced by Kureha Kagaku Co.) was poured into the dish so that the height of the oil became 5 mm. from the lower end of the glass tube, and then the height of the oil ascended between the film surfaces by capillary phenomenon at 25° C. for 6 hours was measured.

Table 5

| Run No. | Temperature of hot roll (° C.) | K value at portion from the surface contacted with hot roll to a thickness of 10% | K value at remaining portion | Distribution density of network elements (number/cm²) | Size of network elements (μ) |
|---|---|---|---|---|---|
| 1 | 25 | 0.07 | 0.03 | — | — |
| 2 | 35 | 0.11 | " | 10,000 – 20,000 | 10 – 250 |
| 3 | 60 | 0.19 | 0.06 | " | " |
| 4 | 90 | 0.30 | 0.08 | 7,000 – 15,000 | " |

Table 6

| Run No. | Stretching temperature at stretch initiation point (° C.) | Preheating time (sec.) | Distribution density of network elements (number/cm$^2$) | Size of network elements ($\mu$) | Haze (%) | Oil penetration height (mm.) |
|---|---|---|---|---|---|---|
| 1 | 140 | 80 | — | — | 4.1 | 20 |
| 2 | 148 | " | 70,000 – 90,000 | 10 – 150 | 19.2 | 69 |
| 3 | 156 | " | " | " | 22.7 | 73 |
| 4 | " | 130 | " | " | 18.6 | 61 |
| 5 | " | 180 | — | — | 5.0 | 25 |

EXAMPLE 12

Biaxially stretched polypropylene films were prepared in the same manner as in the case of the film of Run No. 3 of Example 11, except that the stretch ratio was varied as shown in Table 7. The biaxially stretched film of Run No. 2 in Table 7 had a substantially smooth surface, but on one side of the biaxially stretched film of Run No. 1 in Table 7 was present a surface layer having a network structure composed of an aggregate of network elements consisting of fibril-like materials, creasy materials and film-like materials. The distribution densities and sizes of the network elements of these films were as shown in Table 7. The haze and oil penetration heights of these films, as measured in the same manner as in Example 11, are also shown in Table 7.

Table 7

| Run No. | Stretch ratio (longitudinal x transverse) | Distribution density of network elements (number/cm$^2$) | Size of network elements ($\mu$) | Haze (%) | Oil penetration height (mm.) |
|---|---|---|---|---|---|
| 1 | 7 × 7 | 50,000 – 70,000 | 10 – 200 | 13.4 | 49 |
| 2 | 8 × 8 | — | — | 2.8 | 18 |

EXAMPLE 13

A polypropylene having an intrinsic viscosity of 1.99 dl/g, as measured in tetraline at 135° C., and an isotacticity index of 97% was fed to a 50 mm $\phi$ extruder equipped with the ring die 14 (lip clearance 1 mm.) shown in FIG. 2, and then melt-extruded at a screw rotation number of 100 r.p.m. and at an extrusion temperature of 218° C. to form a tubular melt 16. Subsequently, the tubular melt 16 was taken up at a take-up rate of 4.3 m/min., while sliding the inner surface of said melt 16 in contact with five disc-like members 17 and while cooling the outer surface thereof with water 19 at 40° C. in a water tank 18 having a water surface level 20 cm. below the said ring die 14, so that the tubular stayed for 20 seconds in said water tank 18, to obtain an unstretched tubular molded article. The K value at a portion from the inner surface of the said unstretched molded article to a thickness of 10% in the thick-wall direction was 0.25, while the K value at the remaining portion was 0.02. Thereafter, the unstretched molded article was biaxially stretched according to tubular biaxially stretching process under such conditions that the temperature at the stretch initiation point was 153° C., the stretch ratio in the longitudinal direction was 5 times and the stretch ratio in the transverse direction was 5.3 times, and then subjected to heat treatment with hot air at 140° C. for 30 seconds under an 8% limited shrinkage to obtain a biaxially stretched polypropylene film of 20$\mu$ in thickness. On one side (hereinafter referred to as "the side A") of said biaxially stretched film was present a surface layer having a network structure composed of an aggregate of network elements consisting of fibril-like materials, creasy materials and film-like materials, and the distribution density of network elements constituting the said network structure was 30,000 to 50,000 per cm$^2$ of the film surface, while the size thereof was 10 to 250$\mu$. On the other side (hereinafter referred to as "the side B") was present a two-dimensional network structure composed of creasy materials, and the distribution density of network elements constituting the said network structure was 700 to 900 per cm$^2$ of the film surface. Subsequently, the said biaxially stretched film was cut in the longitudinal direction to a width of 15 cm. to prepare two films. The sides A of these two films were superposed each other, the resulting composite film was wound around a glass tube of 5 cm. in outer diameter and 15 cm. in length, the glass tube was erected in a petri dish, a synthetic insulating oil polybutene was poured into the dish so that the height of the poured polybutene became 1 cm. from the lower end of the glass tube, and the penetration height of the polybutene ascending through the film surfaces by capillary phenomenon at 25° C. for 24 hours was measured to obtain a value of 12 to 14 cm. On the other hand, the penetration height of polybutene, in the case where the sides B of the films were superposed each other, was 2 to 4 cm.

EXAMPLE 14

The biaxially stretched polypropylene film obtained in Example 13 and an aluminum foil were superposed each other so that the side A of the biaxially stretched film contacted with the mirror surface of the aluminum foil, and the resulting composite was convoluted to prepare a condenser element. This condenser element was impregnated in vacuum with a synthetic insulating oil polybutene at 80° C. for 24 hours. Thereafter, the condenser element was unconvoluted to investigate the penetration and impregnation state of the polybutene. As the result, the polybutene had penetrated the whole surface of the film and had sufficiently wetted the film.

EXAMPLE 15

The unstretched tubular molded article obtained in Example 11 was biaxially stretched according to tubular biaxially stretching process under such conditions that the temperature at the stretch initiation point was 155° C., the stretch ratio in the longitudinal direction was 5 times and the stretch ratio in the transverse direction was 5.3 times, and then subjected to heat treatment with hot air at 140° C. for 30 seconds under an 8% limited shrinkage to obtain a biaxially stretched polypropylene film of 20µ in thickness. This biaxially stretched film was slitted to a width of 120 mm. and then convoluted together with an aluminum foil of 15µ in thickness to prepare a condenser element. The thus prepared condenser element was dried according to an ordinary procedure, placed in a condenser accomodation metal case, and then vacuum-impregnated with a mineral oil at 80° C. for 24 hours.

For comparison, a condenser element was prepared under the same conditions as above, except that there was used a usual, surface-smooth, biaxially stretched polypropylene film for electrical appliances which had not been roughened at the surface, and then vacuum-impregnated with a mineral oil at 80° C. for 24 hours in the same manner as above.

These condensers were compared in oil impregnancy with each other. As the result, the condenser using the surface-smooth film was marked in capacity variation and showed a capacity variation of 6% after 2 days, while the condenser using the biaxially stretched film of the present invention showed a capacity variation of −0.2%.

Further, the dielectric loss factor (tan δ) at room temperature, corona start voltage and corona extinction voltage of each condenser were as shown in Table 8.

Table 8

| Sample | Corona start voltage (V) | Corona extinction voltage (V) | tan δ (%) |
|---|---|---|---|
| Condenser of the present invention | 3,700 | 3,100 | 0.054 |
| Control condenser | 1,300 | 500 | 0.048 |

EXAMPLE 16

A condenser using the biaxially stretched film of the present invention obtained in Example 15, and a condenser using the surface-smooth polypropylene film used in Example 15, were prepared in the same manner as in Example 15, and then impregnated with a mineral oil at 80° C. while varying the impregnation time. Thereafter, the two condensers were broken to observe the oil impregnation state of each condenser. The results obtained were as shown in Table 9.

From the results shown in Table 9, it is understood that the condenser using the biaxially stretched film of the present invention is quite excellent in oil impregnancy, and thus suggests the practical use of an all propylene film condenser.

Table 9

| Impregnation time | Condenser of the present invention | Control condenser |
|---|---|---|
| 2 hours | Scarcely impregnated | Scarcely impregnated |
| 6 hours | Partly unimpregnated | " |
| 12 hours | No unimpregnated portion | Partly unimpregnated |
| 18 hours | " | " |
| 24 hours | " | Slight unimpregnated portion observed |

Comparative Example 1

Three kinds of biaxially stretched polypropylene films (A), (B) and (C) were prepared in the manner mentioned below.

(A) In Example 11, the tubular melt 3 was formed by lowering only the temperature of the hard chromium-made cylindrical member 4 to obtain an unstretched tubular molded article having a K value of 0.08 at a portion from the inner surface of the molded article to a thickness of 10% in the thick-wall direction. The thus obtained unstretched tubular molded article was biaxially stretched and heat-treated under the same conditions as in Example 15 to prepare the film (A).

(B) The unstretched tubular molded article obtained in Example 11 was biaxially stretched and heat-treated in the same manner as in Example 15, except that only the temperature of the stretch initiation point was varied to 140° C., to prepare the film (B).

(C) The unstretched tubular molded article obtained in Example 11 was biaxially stretched and heat-treated in the same manner as in Example 15, except that only the stretch ratios in both longitudinal and transverse directions were varied to 8.1 times, to prepare the film (C).

All these films (A), (B) and (C) had substantially smooth surfaces. Using these films, condensers were prepared in the same manner as in Example 15, but the corona start voltages and corona extinction voltages of these condensers were not practically desirable like in the case of the control condenser prepared in Example 15.

EXAMPLE 17

The biaxially stretched polypropylene film obtained in Example 13 was slitted to a width of 120 mm. and then convoluted together with an aluminum electrode foil of 8µ in thickness to prepare a condenser element. This condenser element was pressed and dried according to an ordinary procedure, placed in a condenser accomodation metal case, and then vaccum-impregnated with a mineral oil at 80° C. for 24 hours to obtain a condenser.

For comparison, a condenser element was prepared under the same conditions as above, except that there was used a usual, surface-smooth, biaxially stretched polypropylene film for electrical appliances which had not been roughened at the surface, and then vacuum-impregnated with a mineral oil at 80° C. for 24 hours in the same manner as above to obtain a condenser.

These condensers were compared in oil impregnancy with each other. As the result, the condenser using the surface-smooth film was marked in capacity variation and showed a capacity variation of 6% after 2 days, while the condenser using the biaxially stretched film of the present invention showed a capacity variation of −0.1%.

Further, the dielectric loss factor (tan δ) at room temperature, corona start voltage and corona extinction voltage of each condenser were as shown in Table 10.

Table 10

| Sample | tan δ (%) | Corona start voltage (V) | Corona extinction voltage (V) |
|---|---|---|---|
| Condenser of the present invention | 0.052 | 3,700 | 3,200 |
| Control | | | |

Table 10-continued

| Sample | tan δ (%) | Corona start voltage (V) | Corona extinction voltage (V) |
|---|---|---|---|
| condenser | 0.048 | 1,300 | 500 |

EXAMPLE 18

A condenser using the biaxially stretched film of the present invention obtained in Example 13, and a condenser using the surface-smooth polypropylene film used in Example 17, were prepared in the same manner as in Example 17, and then impregnated with a mineral oil at 80° C. while varying the impregnation time. Thereafter, the two condensers were broken to observe the oil impregnation state of each condenser. The results obtained were as shown in Table 11.

From the results shown in Table 11, it is understood that the condenser using the biaxially stretched film of the present invention is quite excellent in oil impregnancy, and thus suggests the practical use of an all propylene film condenser.

Table 11

| Impregnation time | Condenser of the present invention | Control condenser |
|---|---|---|
| 2 hours | Scarcely impregnated | Scarcely impregnated |
| 6 hours | Partly unimpregnated | " |
| 12 hours | No unimpregnated portion | Partly unimpregnated |
| 18 hours | " | " |
| 24 hours | " | Slight unimpregnated portion observed |

EXAMPLE 19

Using a solid state type corona treatment machine, the side lower in distribution density of network elements, i.e. the side B, of the biaxially stretched polypropylene film obtained in Example 13 was subjected to corona discharge treatment at a treatment rate of 21.5 m/min. In this treatment, the output was so controlled that the wet index of the resulting film became 40 dyne/cm. Subsequently, this film was slitted, and then set in a vacuum metallizer to deposit the vapor of aluminum metal according to an ordinary procedure onto the corona-treated film surface. The thickness of the metal vapor-deposited film was 2 Ω in terms of electric resistance value and was about 200 A in terms of metal film thickness.

Thereafter, two sheets of the above-mentioned metal vapor-deposited, biaxially stretched polypropylene film were convoluted, and the resulting composite was pressed according to an ordinary procedure and then subjected to metallikon treatment at the central portion between the two ends to the form of a band to prepare a condenser element. This condenser element was dried according to an ordinary procedure, placed in a condenser accomodation metal case, and then vacuum-impregnated with a mineral oil at 80° C. for 24 hours to obtain a condenser.

For comparison, a condenser element was prepared under the same conditions as above, except that there was used a usual, surface-smooth biaxially stretched polypropylene film which had not been roughened at the surface, and then vacuum-impregnated with a mineral oil in the same manner as above to obtain a control condenser.

The dielectric loss factor (tan δ), corona start voltage and oil impregnation state of each condenser were as shown in Table 12.

Table 12

| Sample | tan δ (%) at 85° C. | Corona start voltage (V) | state (destruction test) |
|---|---|---|---|
| Condenser of the present invention | 0.02 – 0.03 | 430 | Wholly impregnated |
| Control condenser | 0.02 – 0.08 | 270 | Partly unimpregnated |

EXAMPLE 20

Two sheets of the aluminum metal vapor-deposited, biaxially stretched polypropylene film of the present invention obtained in Example 19 were superposed each other and convoluted, and the resulting composite was pressed according to an ordinary procedure and then subjected to metallikon treatment at the central portion between the two ends to the form of a band to prepare a condenser element. This condenser element was pre-dried at 80° C. for 8 hours, thereafter vacuum-dried at 80° C. for 12 hours in a vacuum of $2-3 \times 10^{-2}$ Torr, and then filled with an epoxy resin to prepare a condenser having a capacity of 10 μF.

For comparison, a condenser was prepared in the same manner as above, except that there was used a usual, biaxially stretched polypropylene film for condenser which had not been roughened at the surface.

The dielectric loss factor (tan δ), and corona start voltage of each condenser were as shown in Table 13.

Table 13

| Sample | tan δ (%) at 85° C., 50 HZ | tan δ(%) at 85° C., 1 KHZ | Corona start voltage (V, AC) |
|---|---|---|---|
| Condenser of the present invention | 0.01 – 0.03 | 0.12 – 0.16 | 352 |
| Control condenser | 0.03 – 0.05 | 0.36 – 0.52 | 280 | tan δ : 300 V, AC.

What is claimed is:

1. A translucent polypropylene film containing no β-type crystallization nucleating agent, characterized in that the film has, on at least one side, a surface layer composed of a two- or three-dimensional network structure, in which network elements constituting the said network structure are present in a proportion of at least 1,000 per cm² of the film surface, and is quite dense in inner structure, and high in airtightness.

* * * * *